US012731422B2

(12) United States Patent
Singh et al.

(10) Patent No.: US 12,731,422 B2
(45) Date of Patent: Sep. 8, 2026

(54) MATCHING DIGITAL FONTS UTILIZING A RESIDUAL NEURAL NETWORK

(71) Applicant: Adobe Inc., San Jose, CA (US)

(72) Inventors: Amit Vikram Singh, Benares (IN); Kaushal Kishore, New Delhi (IN); Praveen Kumar Dhanuka, Howrah (IN); Vineet Batra, Pitam Pura (IN); Zhaowen Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 222 days.

(21) Appl. No.: 18/417,578

(22) Filed: Jan. 19, 2024

(65) Prior Publication Data

US 2025/0239098 A1 Jul. 24, 2025

(51) Int. Cl.

*G06V 30/18* (2022.01)
*G06T 11/10* (2026.01)
*G06T 11/23* (2026.01)
*G06V 10/82* (2022.01)
*G06V 10/94* (2022.01)
*G06V 30/19* (2022.01)

(52) U.S. Cl.

CPC ........ *G06V 30/18019* (2022.01); *G06T 11/10* (2026.01); *G06T 11/23* (2026.01); *G06V 10/82* (2022.01); *G06V 10/945* (2022.01); *G06V 30/19127* (2022.01); *G06V 30/19147* (2022.01); *G06T 2200/24* (2013.01)

(58) Field of Classification Search

CPC ............. G06V 30/18019; G06V 10/82; G06V 10/945; G06V 30/19127; G06V 30/19147; G06T 11/001; G06T 11/203; G06T 2200/24

See application file for complete search history.

(56) References Cited

U.S. PATENT DOCUMENTS

| | | | | |
|---|---|---|---|---|
| 8,594,423 | B1 * | 11/2013 | Carpenter | G06T 7/194 382/164 |
| 10,789,780 | B1 * | 9/2020 | Beck | G06T 11/60 |
| 2022/0269869 | A1 * | 8/2022 | Duffy | G06F 40/279 |
| 2022/0358280 | A1 * | 11/2022 | Shirani | G06F 40/169 |
| 2022/0382962 | A1 * | 12/2022 | Schwiebert | G06F 40/106 |

(Continued)

OTHER PUBLICATIONS

Kaiming He and Jian Sun. Convolutional neural networks at constrained time cost, 2014.

(Continued)

*Primary Examiner* — Grace Q Li

(74) *Attorney, Agent, or Firm* — Keller Preece PLLC

(57) ABSTRACT

The present disclosure relates to systems, non-transitory computer-readable media, and methods for determining predicted digital fonts for textual characters within digital images utilizing one or more machine learning models or neural networks. In particular, in one or more embodiments, the disclosed systems determine textual characters within a target digital image and determine one or more predicted fonts for the textual characters utilizing a font recognition machine learning model to extract features of the textual characters from the target digital image, the font recognition machine learning model comprising parameters learned from synthetic text data comprising sample textual images generated with a multi-attribute probabilistic model across a distribution of text attributes.

20 Claims, 12 Drawing Sheets

(56) References Cited

U.S. PATENT DOCUMENTS

| | | | | |
|---|---|---|---|---|
| 2025/0005641 | A1* | 1/2025 | Gardner | G06V 10/70 |
| 2025/0139936 | A1* | 5/2025 | Merchant | G06V 10/56 |

OTHER PUBLICATIONS

Kaiming He, Xiangyu Zhang, Shaoqing Ren, and Jian Sun. Deep residual learning for image recognition, 2015.

Karen Simonyan and Andrew Zisserman. Very deep convolutional networks for large-scale image recognition, 2015.

"Myndex/SAPC-APCA," webpage <https://github.com/Myndex/SAPC-APCA>, 3 pages, 2023, retreived on Jan. 23, 2024.

Zhangyang Wang, Jianchao Yang, Hailin Jin, Eli Shechtman, Aseem Agarwala, Jonathan Brandt, and Thomas S. Huang. Deepfont: Identify your font from an image, 2015.

* cited by examiner

*Fig. 6A*
602
604
606
DINNER
NOV
25
MrLeopold Pro Regular
MrBlaketon Pro Regular
Aphrosine Regular

| Accuracy | | | |
|---|---|---|---|
| Model | Top-1 | Top-3 | Top-10 |
| Prior | **0.36** | 0.48 | 0.56 |
| Ours | **0.85** ↑ | **0.93** ↑ | **0.95** ↑ |

*Fig. 6B*

MATCHING DIGITAL FONTS UTILIZING A RESIDUAL NEURAL NETWORK

BACKGROUND

Recent years have seen significant improvements in digital graphics tools for creating or modifying digital content. In particular, individuals and businesses increasingly utilize digital graphics tools to edit images. Indeed, with increased availability of digital graphics tools via commercial, personal, and mobile devices, many individuals and businesses produce digital images and utilize digital graphics tools to edit those digital images. Many such digital images include textual content converted into pixel values when imported into raster format. Consequently, recovering information about the textual content from the pixel values when generating digital art or other digital images with consistent typography can be a challenging task. Specifically, editing flattened typography within digital images by recreating text in an accessible digital font that matches the original text as closely as possible is often difficult due to the lack of font information in many digital images. Many conventional font matching systems that identify digital fonts for textual content within digital images have a number of shortcomings with regard to accuracy, efficiency, and flexibility.

BRIEF SUMMARY

Embodiments of the present disclosure solve one or more of the foregoing or other problems in the art with systems, non-transitory computer-readable media, and methods for matching digital fonts to textual content within digital images. In particular, the disclosed systems utilize a trained machine learning model, such as but not limited to a deep residual convolutional neural network, to determine one or more predicted fonts for textual characters within a digital image. For example, embodiments of the present disclosure determine predicted fonts utilizing a font recognition machine learning model with parameters learned from synthetic data to extract learned features of textual characters from a target digital image. Specifically, the disclosed systems learn parameters of the machine-learning model based on sample textual images generated with a multi-probabilistic model across a distribution of text attributes. For example, the disclosed systems and methods generate the synthetic data by utilizing a multi-probabilistic model to sample text attributes from a distribution of text attributes within a text-attribute database. Having randomly selected various text attributes, the disclosed systems and methods generate sample textual images in a rendered digital image format with one or more generated textual characters having known digital fonts and other randomly selected text attributes.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 6A-6B illustrate experimental results of a digital font matching system determining predicted fonts for textual characters within target digital images in accordance with one or more embodiments.

DETAILED DESCRIPTION

Figure 1:
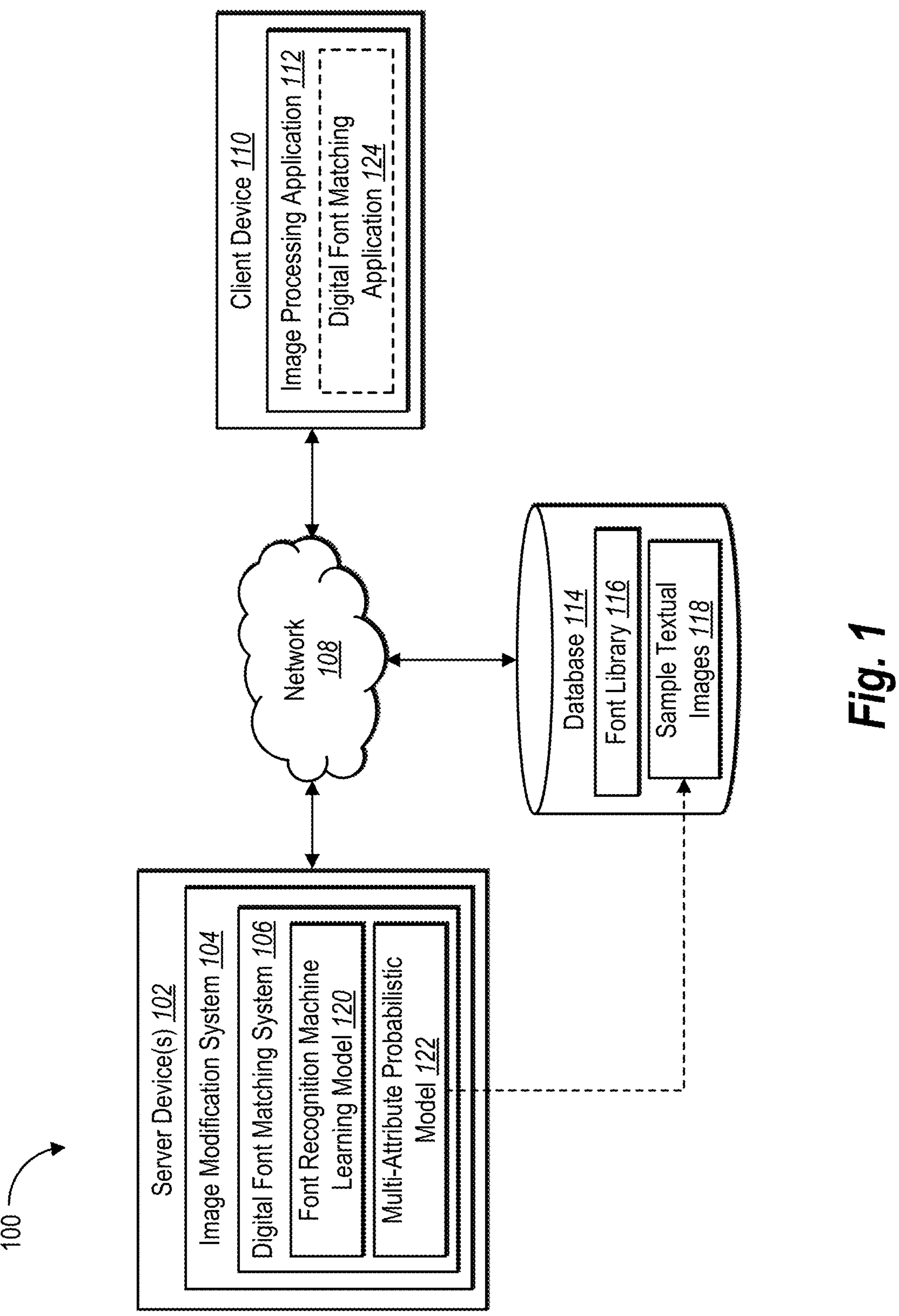
FIG. 1 illustrates a diagram of an environment in which a digital font matching system operates in accordance with one or more embodiments.

This disclosure describes one or more embodiments of a digital font matching system that utilizes a font recognition machine learning model to determine one or more predicted fonts for textual characters within a target digital image. In one or more implementations, for example, the digital font matching system utilizes a deep residual convolutional neural network to determine predicted fonts for textual characters within a given digital image and provide the predicted fonts for the textual characters for selection use in image editing. Additionally, in some embodiments, the digital font matching system generates synthetic digital text data which closely resembles real-world digital images for training the font recognition machine learning model by utilizing a multi-attribute probabilistic model to randomly sample text attributes across a distribution of text attributes and render sample textual images with the sampled text attributes.

To further illustrate, in one or more embodiments, the digital font matching system determines one or more textual characters within a target digital image, determines one or more predicted fonts for the textual characters utilizing a font recognition machine learning model, and presents the predicted fonts via a user interface on a client device. To illustrate, the digital font matching system determines the predicted font(s) by extracting learned features of the textual character(s) from the target digital image utilizing the font recognition machine learning model. Also, in some embodiments, the digital font matching system utilizes a font recognition model comprising parameters learned from synthetic text data including sample textual images generated with a multi-attribute probabilistic model across a distribution of text attributes. In response to receiving a user selection of a replacement font based on the presented predicted fonts for the textual characters, the digital font matching system can replace the textual characters within the target digital image with one or more replacement textual characters in the replacement font and, in some cases, modify the target digital image by adding, removing, or replacing at least one of the replacement textual characters.

As mentioned, in one or more embodiments, the digital font matching system generates a synthetic text dataset utilizing a multi-attribute probabilistic model to select text attributes from a distribution of text attributes. In some embodiments, for example, the digital font matching system generates a plurality of sample textual images having random text attributes selected from a distribution of text attributes in a text-attribute database. For example, a sample textual image of the plurality of sample textual images comprises a known font that the digital font matching system samples from the text-attribute database in a rendered digital image format comprising one or more generated textual characters with selected text attributes and one or more background attributes. Also, in one or more embodiments, the digital font matching system generates one or more predicted fonts for a sample textual image utilizing a font recognition machine learning model and adjusts parameters of the font recognition machine learning model based on a comparison between the predicted fonts and a known font for the sample textual image.

In one or more implementations, the disclosed digital font matching system provides a variety of advantages and benefits over conventional systems and methods for determining digital fonts for textual characters within digital images. In contrast to conventional systems that convert detected fonts to outlines (e.g., from raster pixels), the font recognition machine learning model improves accuracy by leveraging a machine learning model trained on sample images (e.g., raster images) including text and backgrounds with various attributes. For instance, by utilizing a font recognition machine learning model comprising parameters learned from synthetic text data including sample textual images generated according to one or more embodiments, the digital font matching system determines predicted fonts for textual characters within a target digital image with increased accuracy and fidelity to original textual content of the target digital image. Furthermore, by providing predicted fonts with increased accuracy, the digital font matching system also implements modified text within target digital images with increased accuracy and fidelity compared to conventional systems.

Furthermore, by generating synthetic text data utilizing a multi-attribute probabilistic model, the digital font matching system provides sample textual images with increased accuracy in representing textual characters in real digital images (including text with digital fonts or handwritten text). Specifically, in contrast to conventional systems that use models trained only on different fonts, the digital font matching system improves the flexibility and accuracy of computing systems that detect fonts in digital images by using a dataset of digital images including text and background attributes sampled in a variety of different configurations. Accordingly, in at least some implementations, the digital font matching system trains a font recognition machine learning model with further increased accuracy relative to existing systems for recommending digital fonts. Additionally, the digital font matching system provides increased flexibility over conventional systems by generating a synthetic text dataset with sample textual images having randomly sampled text attributes across a distribution of text attributes.

Additionally, the digital font matching system provides improved efficiency over conventional systems. In particular, by utilizing a deep residual convolutional neural network with reduced dimensionality, the digital font matching system can provide high font matching accuracy with a light-weight neural network architecture capable of running locally on user devices. For example, the digital font matching system uses linear transformations of textual features extracted from a digital image to map an extracted vector to a smaller size for use in matching the extracted features to known font features. The digital font matching system thus reduces the dimensionality of the font recognition machine learning model, allowing implementation on devices with fewer resources and providing fast font matching during inference over larger conventional systems.

Turning now to the figures, FIG. 1 illustrates a schematic diagram of one embodiment of a system 100 (or environment) in which a digital font matching system 106 operates in accordance with one or more embodiments. As illustrated, the system 100 includes server device(s) 102, a network 108, a client device 110, and database 114. As further illustrated, the server device(s) 102, the client device 110, and the database 114 communicate with one another via the network 108.

As shown in FIG. 1, the server device(s) 102 include an image modification system 104 that further includes the digital font matching system 106. For instance, the server device(s) 102 includes, but is not limited to, a computing device (such as explained below in reference to FIG. 10). In some embodiments, the digital font matching system 106 utilizes a font recognition machine learning model 120 to determine predicted fonts for textual characters within digital images, as further discussed below. Also, in some embodiments, the digital font matching system 106 utilizes a multi-attribute probabilistic model 122 to generate a plurality of sample textual images 118 for training the font recognition machine learning model 120 to determine predicted fonts for textual characters within digital images, as further discussed below.

In some instances, the digital font matching system 106 receives a request from the client device 110 to determine predicted fonts for a target digital image. In response, the digital font matching system 106 identifies one or more textual characters within the target digital image and determines, utilizing the font recognition machine learning model 120, one or more predicted fonts for the textual characters. In one or more embodiments, for example, the digital font matching system 106 determines one or more predicted fonts from a font library 116 (e.g., 20,000+ fonts stored at the database 114) that match or resemble the one or more textual characters within the target digital image.

Furthermore, as shown in FIG. 1, the system 100 includes the client device 110. In some embodiments, the client device 110 includes, but is not limited to, a mobile device (e.g., smartphone, tablet), a laptop, a desktop, or any other type of computing device, including those explained below in reference to FIG. 10. Although not shown in FIG. 1, some embodiments of client device 110 are operated by a user to perform a variety of functions via an image processing application 112. For example, the client device 110 (through the image processing application 112 and the digital font matching application 124) performs functions such as, but not limited to, determining predicted fonts for textual characters within digital images and modifying the textual characters implementing a selected digital font. In addition, in some embodiments, the client device 110 also receives modified versions of digital images (e.g., target digital images modified by replacing textual characters according to a selected digital font) from the digital font matching system 106.

To access the functionalities of the digital font matching system 106 (as described above and in greater detail below), in one or more embodiments, a user interacts with the image processing application 112 on the client device 110. For example, the image processing application 112 includes one or more software applications (e.g., to interact with and/or modify images in accordance with one or more embodiments herein) installed on the client device 110, such as the digital font matching application 124. In certain instances, the image processing application 112 is hosted on the server device(s) 102. Additionally, when hosted on the server device(s) 102, the image processing application 112 is accessed by the client device 110 through a web browser and/or another online interfacing platform and/or tool.

Although FIG. 1 illustrates the digital font matching system 106 being implemented by a particular component and/or device within the system 100 (e.g., the server device(s) 102), in some embodiments the digital font matching system 106 is implemented, in whole or part, by other computing devices and/or components in the system 100. For instance, in some embodiments, the digital font matching system 106 is implemented on the client device 110 within the digital font matching application 124. More specifically, in one or more embodiments, the description of (and acts performed by) the digital font matching system 106 are implemented (or performed by) the digital font matching application 124 when the client device 110 implements the digital font matching system 106. In particular, in some embodiments, the client device 110 (via an implementation of the digital font matching application 124) utilizes the font recognition machine learning model 120 to determine predicted fonts for textual characters within digital images and the multi-attribute probabilistic model 122 to generate synthetic text data for training the font recognition machine learning model 120.

In some embodiments, the server device(s) 102 trains one or more machine learning models described herein. For example, the digital font matching system 106 on the server device(s) 102 provides the one or more trained machine-learning models to the digital font matching application 124 on the client device 110 for implementation. In other words, the client device 110 obtains (e.g., downloads) the machine learning models from the server device(s) 102. At this point, the client device 110 may utilize the machine learning models to determine predicted fonts and/or modify digital images independent from the server device(s) 102.

In some embodiments, the digital font matching application 124 includes a web hosting application that allows the client device 110 to interact with content and services hosted on the server device(s) 102. To illustrate, in one or more implementations, the client device 110 accesses a web page or computing application supported by the server device(s) 102. The client device 110 provides input to the server device(s) 102 (e.g., a digital image). In response, the digital font matching system 106 on the server device(s) 102 performs operations described herein to determine predicted fonts and modify digital images. The server device(s) 102 then provides the output or results of the operations (e.g., a modified digital image) to the client device 110.

As further shown in FIG. 1, the system 100 includes the database 114. In one or more embodiments, the database 114 includes, but is not limited to, a server device, a cloud service computing device, or any other type of computing device (including those explained below with reference to FIG. 10) that stores the font library 116, the sample textual images 118 generated using the multi-attribute probabilistic model 122, and other information of utility to the digital font matching system 106. In some embodiments, the digital font matching system 106 accesses the database 114 to retrieve one or more sample textual images. For example, the digital font matching system 106 utilizes sample textual images from the database 114 to train the font recognition machine learning model 120.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 10. Furthermore, although FIG. 1 illustrates the server device(s) 102, the client devices 110, and the database 114 communicating via the network 108, in certain embodiments, the various components of the system 100 communicate and/or interact via other methods (e.g., the server device(s) 102 and the client device 110 communicating directly).

Figure 2:
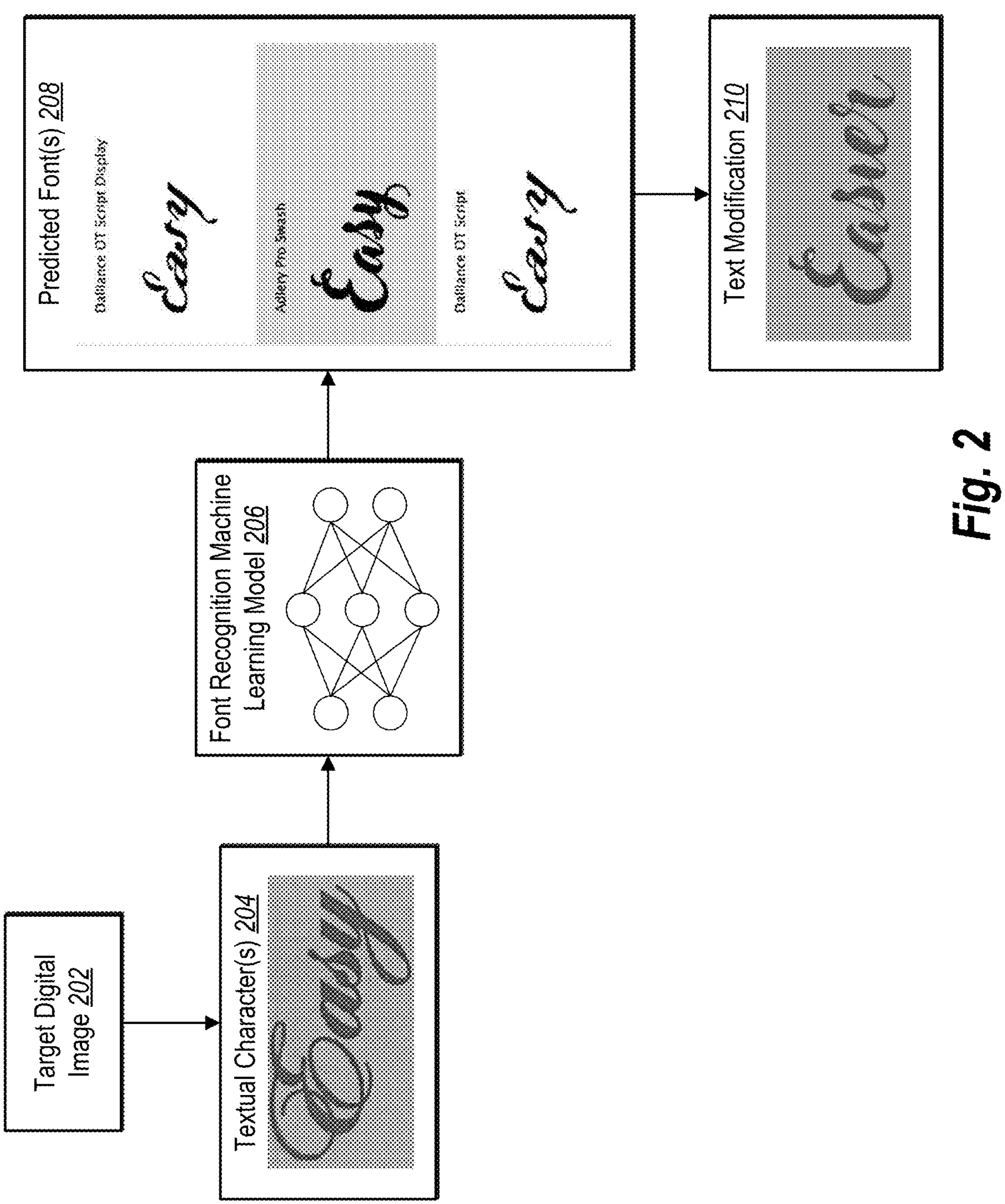
FIG. 2 illustrates an overview of a digital font matching system determining predicted fonts for textual characters within a target digital image in accordance with one or more embodiments.

As mentioned, in one or more embodiments, the digital font matching system 106 analyzes textual characters within digital images to determine one or more predicted fonts for replacement and/or modification of the respective textual characters. For example, FIG. 2 illustrates the digital font matching system 106 utilizing a font recognition machine learning model 206 to determine one or more predicted fonts 208 for textual characters 204 within a target digital image 202. As shown in FIG. 2, the digital font matching system 106 identifies (or receives) the target digital image 202 comprising at least one textual graphic, such as a word or phrase depicted in a stylistic font and identifies (or determines) the one or more textual characters 204 within the target digital image 202. In some embodiments, for example, the digital font matching system 106 utilizes optical character recognition (OCR) or a similar model (e.g., one or more digital image processing neural networks) to identify textual characters within the target digital image 202. Furthermore, in some implementations, the digital font matching system 106 identifies multiple words or phrases comprising different fonts and/or typography styles. In such cases, the digital font matching system 106 considers each word or phrase separately.

As mentioned, the digital font matching system 106 determines predicted fonts for textual characters within target digital images. An image (sometimes referred to as a digital image) refers to a digital symbol, picture, icon, and/or other visual illustration depicting one or more objects. For instance, an image includes a digital file having a visual illustration and/or depiction including typography and/or other visual graphics. Indeed, in some embodiments, an image includes, but is not limited to, a digital file with the following extensions: JPEG, TIFF, BMP, PNG, RAW, or PDF. In addition, in certain instances, an image includes a digital frame of a digital video. In particular, in one or more embodiments, an image includes a digital frame within, but not limited to, a digital file with the following extensions: MP4, MOV, WMV, AVI, or AVI.

Moreover, in some embodiments, a digital image includes a vector image or a raster image having textual characters comprising respective vector graphics or raster graphics.

Vector images or vector graphics, for instance, refer to digital images represented using mathematical equations that define geometric shapes such as points, lines, curves, and polygons in a resolution-independent manner. Raster graphics or raster images, also known as bitmap or pixel-based images, refer to digital images comprising a grid of individual pixels, each individual pixel having a respective color and brightness. Accordingly, in some embodiments, the digital font matching system 106 determines one or more textual characters within vector graphics or raster graphics of a target digital image. In some embodiments, the digital font matching system 106 converts digital images (e.g., vector images) to raster images prior to determining textual characters in the digital images.

As shown in FIG. 2, having identified the one or more textual characters 204 within the target digital image 202, the digital font matching system 106 utilizes the font recognition machine learning model 206 to determine the one or more predicted fonts 208 for the textual characters 204. In some embodiments, for example, the font recognition machine learning model 206 comprises a convolutional neural network. Accordingly, the digital font matching system 106 utilizes convolutional layers of the font recognition machine learning model 206 to extract learned features of the one or more textual characters 204 from the target digital image 202. Further, in one or more embodiments, the font recognition machine learning model 206 generates a feature vector for the one or more textual characters 204 by applying a linear transformation to reduce a dimensionality of the extracted learned features.

In one or more embodiments, a machine learning model includes a computational algorithm or system configured to learn patterns and make predictions or decisions based on features of input data. In one or more embodiments, for example, the font recognition machine learning model utilized by the digital font matching system comprises a trained neural network. For example, a neural network includes a machine learning model that is tunable (e.g., trained) based on inputs to approximate unknown functions. In particular, a neural network includes a model of interconnected neurons that communicate and learn to approximate complex functions and generate outputs based on a plurality of inputs provided to the model. For instance, a neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), a recurrent neural network (e.g., a long short-term memory neural network), a generative adversarial neural network (GAN), a deep residual convolutional neural network (e.g., ResNet-CNN or ResNet-34), or another multi-layer neural network. In some embodiments, a neural network includes a combination of neural networks or neural network components.

Moreover, in one or more embodiments, a feature includes digital information describing all or part of a digital image. Features are represented as vectors, tensors, or codes (e.g., latent codes) that the digital font matching system 106 generates by extracting features utilizing a global and spatial autoencoder. Features optionally include observable characteristics or observable information pertaining to a digital image such as a color or a geometric layout. Additionally (or alternatively), in some embodiments, features include latent features (e.g., features within the various layers of a neural network and that may change as they are passed from layer to layer) and/or unobservable deep features generated by the global and spatial autoencoder.

As also shown in FIG. 2, the digital font matching system 106, utilizing the font recognition machine learning model 206, determines the predicted font 208 for the textual characters 204. In the illustrated implementation, the digital font matching system 106 determines that at least three fonts match or resemble the font style of the textual characters 204. Accordingly, the digital font matching system 106 presents (e.g., via a client device) the predicted fonts 208 as selectable options for replacing and/or modifying the textual characters 204 within the target digital image 202. Alternatively, in some embodiments, the digital font matching system 106 selects a best matching predicted font for the textual characters 204 without requiring user selection of a preferred predicted font from the predicted fonts 208.

In addition, as shown in FIG. 2, the digital font matching system 106 generates a text modification 210 of the textual characters 204. In some embodiments, for example, the digital font matching system 106 replaces the textual characters 204 with replacement characters in a selected font from the predicted fonts 208 (e.g., to allow for edits or other modifications to the textual characters 204). As illustrated, the digital font matching system 106 also modifies the textual characters 204 by adding, removing, and/or replacing one or more characters (e.g., changing the word "Easy" to "Easier" as shown in FIG. 2). In one or more embodiments, the digital font matching system 106 also modifies the target digital image 202 to remove/replace the textual character(s) 204 and one or more background portions via one or more digital image editing processes (e.g., an image inpainting model) and inserts the text modification 210 as an additional layer in front of the modified portion(s). In additional embodiments, the digital font matching system 106 also corrects errors in textual characters, such as typos, malformed characters, or OCR errors.

As mentioned above, in one or more embodiments, the digital font matching system 106 utilizes a font recognition machine learning model trained on a dataset of synthetic digital images with text content to extract attributes of textual characters in digital images. Specifically, the font recognition machine learning model includes learned parameters from synthetic text data including sample textual images generated with a multi-attribute probabilistic model across a distribution of text attributes. For example, FIG. 3 illustrates the digital font matching system 106 generating a plurality of sample textual images 314 utilizing a multi-attribute probabilistic model 312 to sample text attributes across one or more distributions of text attributes.

Figure 3:
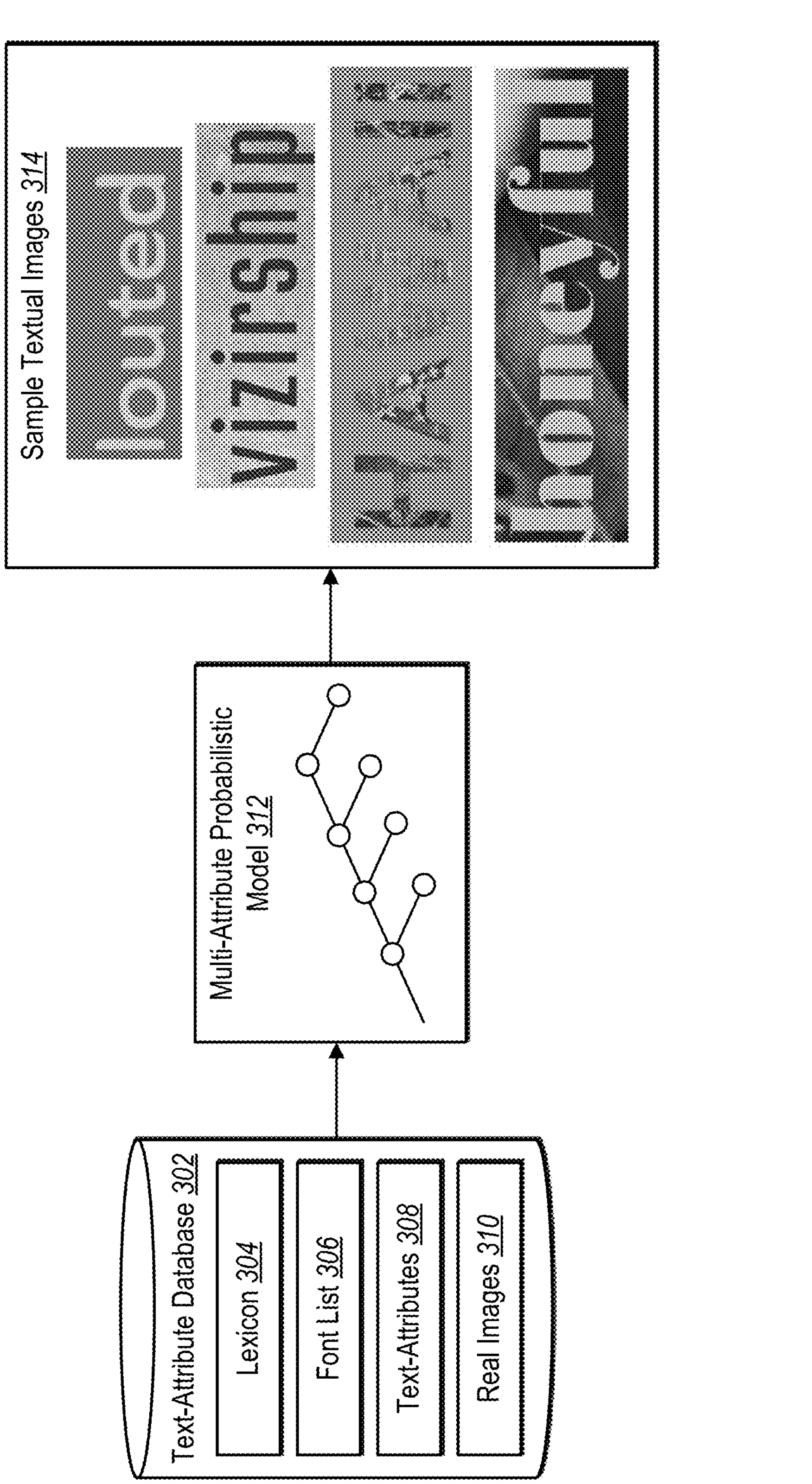
FIG. 3 illustrates an overview of a digital font matching system utilizing a multi-attribute probabilistic model to generate sample textual images in accordance with one or more embodiments.

As shown in FIG. 3, the digital font matching system 106 utilizes the multi-attribute probabilistic model 312 to sample various text attributes from a text-attribute database 302 and renders each sample textual image of the sample textual images 314 according to the sampled text attributes. For instance, the text-attribute database 302 includes a lexicon 304 from which the multi-attribute probabilistic model 312 samples words or phrases (e.g., as described below in relation to FIG. 4A). Accordingly, as rendered utilizing the multi-attribute probabilistic model 312, the sample textual images 314 include a variety of words of various lengths and character combinations.

As also shown in FIG. 3, the text-attribute database 302 includes a font list 306 from which the multi-attribute probabilistic model 312 samples known fonts for each respective sample textual image. By sampling known fonts from the font list 306 of the text-attribute database 302, the multi-attribute probabilistic model 312 generates the sample textual images 314 labeled with ground truth fonts for training a font recognition machine learning model (e.g., as described below in relation to FIG. 5). Accordingly, as rendered utilizing the multi-attribute probabilistic model 312, the sample textual images 314 include textual characters rendered in a variety of known fonts from the font list 306.

Moreover, as also shown in FIG. 3, the text-attribute database 302 includes distributions of text-attributes 308 from which the multi-attribute probabilistic model 312 samples text attributes for each respective sample textual image. In various embodiments, for example, the text-attributes 308 include one or more of a word length, a letter case, a font style, a font size, a measure of kerning, a degree of rotation, a background, a boundary, or a color. Additionally, the text-attribute database 302 includes a collection of real images 310 that the multi-attribute probabilistic model 312 randomly incorporates into the sample textual images 314, either as a background or embedded within textual characters, such as shown in FIG. 3. Accordingly, the multi-attribute probabilistic model 312 samples the text-attributes 308 and/or the real images 310 to generate the sample textual images 314 with multiple randomly sampled variations (e.g., as described below in relation to FIG. 4B). To illustrate, the digital font matching system 106 utilizes the multi-attribute probabilistic model 312 to select font and/or background attributes to render in digital images, such as by inserting textual characters against a background with one or more background attributes and saving the combinations as digital images (e.g., as PNG or JPG files).

As mentioned above, in some embodiments, the digital font matching system 106 utilizes a multi-attribute probabilistic model to generate a synthetic text dataset comprising multiple sample textual images with textual characters having attributes across one or more distributions of text attributes. For example, FIGS. 4A-4B illustrate the digital font matching system 106 utilizing a multi-attribute probabilistic model to generate a sample textual image 416 comprising a variety of sampled text attributes.

Figure 4A:
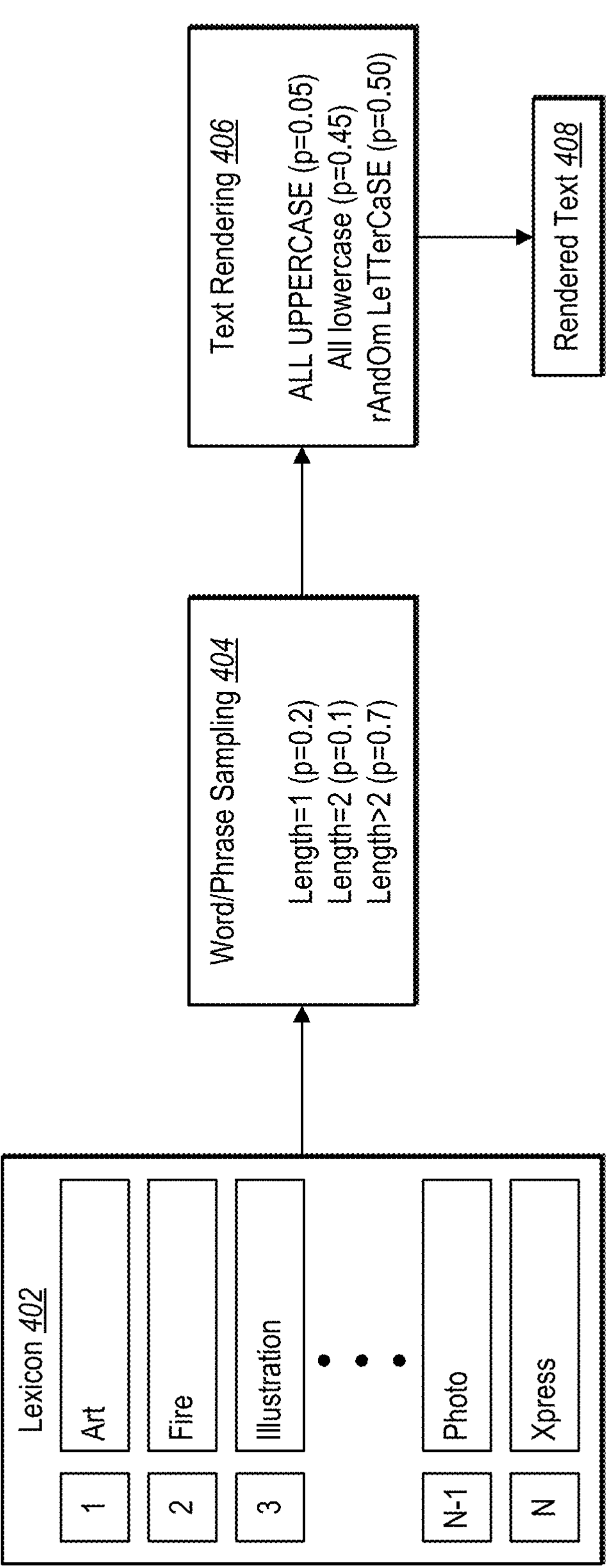
FIGS. 4A-4B illustrate a digital font matching system sampling a distribution of text attributes to generate a sample textual image in accordance with one or more embodiments.
Figure 4B:
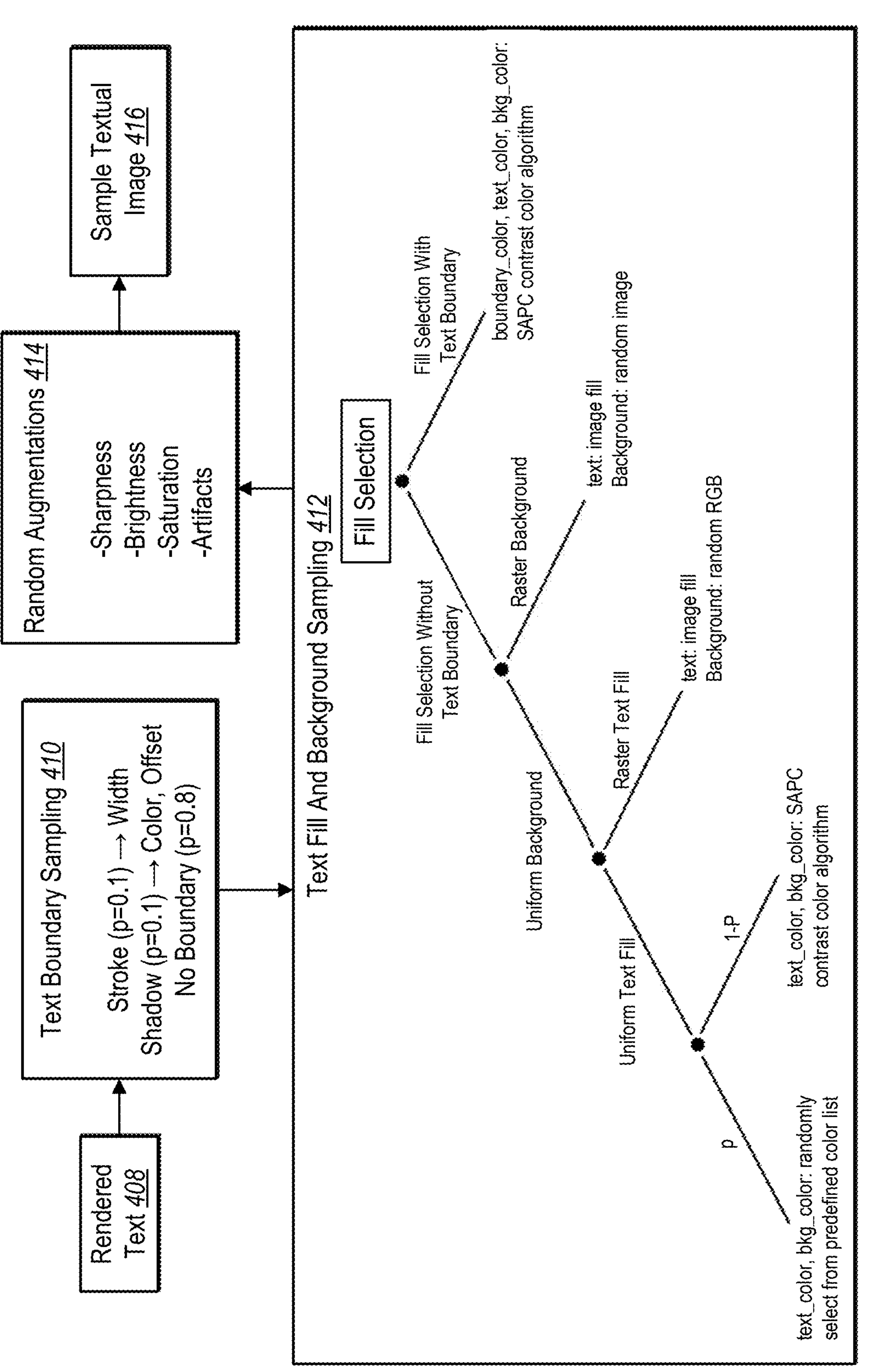

As shown in FIG. 4A, for instance, the digital font matching system 106 samples words or phrases from a lexicon 402, such as a dictionary or other collection of words and/or phrases. In particular, the digital font matching system 106 performs a word/phrase sampling 404 from the lexicon 402 according to one or more probabilities set within the multi-attribute probabilistic model. In the illustrated implementation, for example, the digital font matching system 106 samples words containing a single textual character with a probability of 0.2, samples words with two textual characters with a probability of 0.1, and sample words with more than two textual characters with a probability of 0.7. Accordingly, the digital font matching system 106 generates sample textual images comprising a variety of words or phrases sampled from the lexicon 402.

As also shown in FIG. 4A, the digital font matching system 106 performs a text rendering 406 of the sampled word or phrase with a randomly sampled letter case according to one or more probabilities set within the multi-attribute probabilistic model to generate a rendered text 408. In the illustrated implementation, for example, the digital font matching system 106 renders the sampled word or phrase with all characters in uppercase with a probability of 0.05, with all characters in lowercase with a probability of 0.45, or with a random assortment of uppercase and lowercase characters with a probability of 0.50. Accordingly, the digital font matching system 106 generates the rendered text 408 according to the random sampling 404 of words or phrases from the lexicon 402 and with the randomly selected letter case rendering 406.

Although the description above includes specific examples of sampling probabilities, the digital font matching system 106 is capable of using any combination of sampling probabilities from the distributions of attributes. For instance, the digital font matching system 106 samples different word lengths with different lengths (e.g., different numbers of characters) than those illustrated in FIG. 4A, such as by sampling higher or lower probabilities for single character words, two character words, or three-plus character words. Additionally, in some embodiments, the digital font matching system 106 samples different probabilities of uppercase, lowercase, and mixed-case words than those shown in FIG. 4A.

Moreover, as shown in FIG. 4B, the digital font matching system 106 performs a text boundary sampling 410 to determine a boundary for the rendered text 408, selecting a stroke boundary, a shadow boundary, or no boundary (also referred to as "only-fill" text) according to respective probabilities set within the multi-attribute probabilistic model. In the illustrated implementation, for example, the digital font matching system 106 selects a stroke boundary for characters of the rendered text 408 with a probability of 0.1, selects a shadow boundary for characters of the rendered text 408 with a probability of 0.1, or selects only-fill text with a probability of 0.8. In some embodiments, when a stroke text boundary is selected, the digital font matching system 106 samples a distribution of stroke widths relative to a font size of the rendered text 408. In some implementations, for example, the digital font matching system 106 samples stroke width from a range of [0.5, max(0.5, 0.5+ (fontsize−50)/25)]. In some embodiments, when a shadow text boundary is selected, the digital font matching system 106 renders a text shadow in a different color than the rendered text 408 at a pixel offset of a randomly sample magnitude. In some implementations, for example, the digital font matching system 106 samples the pixel offset of text shadow from a range of [−5,5]. Accordingly, the digital font matching system 106 generates sample textual images with a variety of boundary configurations in stroke, shadow, and only-fill text.

As further shown in FIG. 4B, the digital font matching system 106 utilizes the multi-attribute probabilistic model to perform a text fill and background sampling 412 (e.g., utilizing a decision tree) to determine a text fill and a background for the rendered text 408. As illustrated, for rendered texts having text boundary (e.g., stroke or shadow as selected per the text boundary sampling 410), the digital font matching system 106 utilizes the multi-attribute probabilistic model to randomly sample colors for the text fill, the text boundary, and a background for the rendered text 408. Also, in some embodiments, the digital font matching system 106 utilizes a color contrast algorithm to select colors with acceptable pairwise contrast. In one or more embodiments, for example, the color contrast algorithm comprises an S-LUV Advanced Predictive Color (SAPC) model, an Accessible Perceptual Contrast Algorithm (APCA), or other accessible methods for determining readability between colors with respect to comparative visual contrast.

As further shown in FIG. 4B, the digital font matching system 106 utilizes the multi-attribute probabilistic model to randomly select a background for the rendered text 408. As illustrated, for example, for rendered texts having no boundary (only-fill text), the digital font matching system 106 randomly selects either (i) a uniform background of a randomly sampled color or (ii) a real image background (e.g., a raster graphic depicted behind the rendered text 408) comprising an image randomly sampled from a real image repository (e.g., real images 310 of the text-attribute database 302). In some embodiments, when implementing a uniform background for the rendered text 408, the digital font matching system 106 utilizes a color contrast algorithm, such as those listed above, to select a background color for the textual image 416 with sufficient contrast relative to a color (or colors) of the rendered text 408 (e.g., by comparing a contrast difference to a contrast difference threshold).

Additionally, as shown in FIG. 4B, the digital font matching system 106 utilizes the multi-attribute probabilistic model to randomly select a text fill for the rendered text 408. As illustrated, for example, for rendered texts having a uniform background, the digital font matching system 106 randomly selects either (i) a uniform text fill of a randomly sampled color or (ii) a text fill comprising a real image randomly sampled from a real image repository (e.g., real images 310 of the text-attribute database 302). In some embodiments, when implementing a uniform text fill of a randomly sampled color, the digital font matching system 106 utilizes a color contrast algorithm, such as those listed above, to select a fill color for the rendered text 408 with sufficient contrast relative to a color (or colors) of the respective background for the sample textual image 416 (e.g., based on a contrast difference threshold). Alternatively, in some embodiments, the digital font matching system 106 selects the fill color for the rendered text 408 and/or the background for the sample textual image 416 from a predefined color list. In one or more embodiments, the digital font matching system 106 selects, according to probabilities set within the multi-attribute probabilistic model, either (i) fill and background colors determined via a color contrast algorithm or (ii) fill and background colors from a predefined list for each sample textual image.

Moreover, as shown in FIG. 4B, the digital font matching system 106 implements one or more random augmentations 414 when generating the sample textual image 416. In some embodiments, for example, the digital font matching system 106 utilizes the multi-attribute probabilistic model to randomly sample adjustments to one or more of a sharpness, brightness, saturation, artifacts (e.g., noise), color (e.g., RGB, grayscale), or other characteristic of the textual image 416. In one or more embodiments, the digital font matching system 106 adjusts the characteristics of the sample textual image 416 by randomly sampling visual transformations comprising one or more of auto-contrast, sharpness, blur, grayscale, or visual artifacts (e.g., JPEG artifacts). Accordingly, as particularly illustrated by FIGS. 4A-4B, the digital font matching system 106 utilizes a multi-attribute probabilistic model to generate a diverse synthetic text dataset comprising sample textual images having a variety of randomly sample text attributes and background attributes. In some embodiments, the digital font matching system 106 applies the sampled adjustments to sample textual images via one or more digital image filters.

As mentioned above, in one or more embodiments, the digital font matching system 106 trains a font recognition machine learning model via synthetic text data including sample textual images generated with a multi-attribute probabilistic model. Specifically, as noted previously, the digital font matching system 106 utilizes the multi-attribute probabilistic model to sample text and/or background characteristics across one or more distributions of text and/or background attributes. For example, FIG. 5 illustrates the digital font matching system 106 training a font recognition machine learning model 508 using a synthetic dataset 502 including a plurality of textual images 504.

Figure 5:
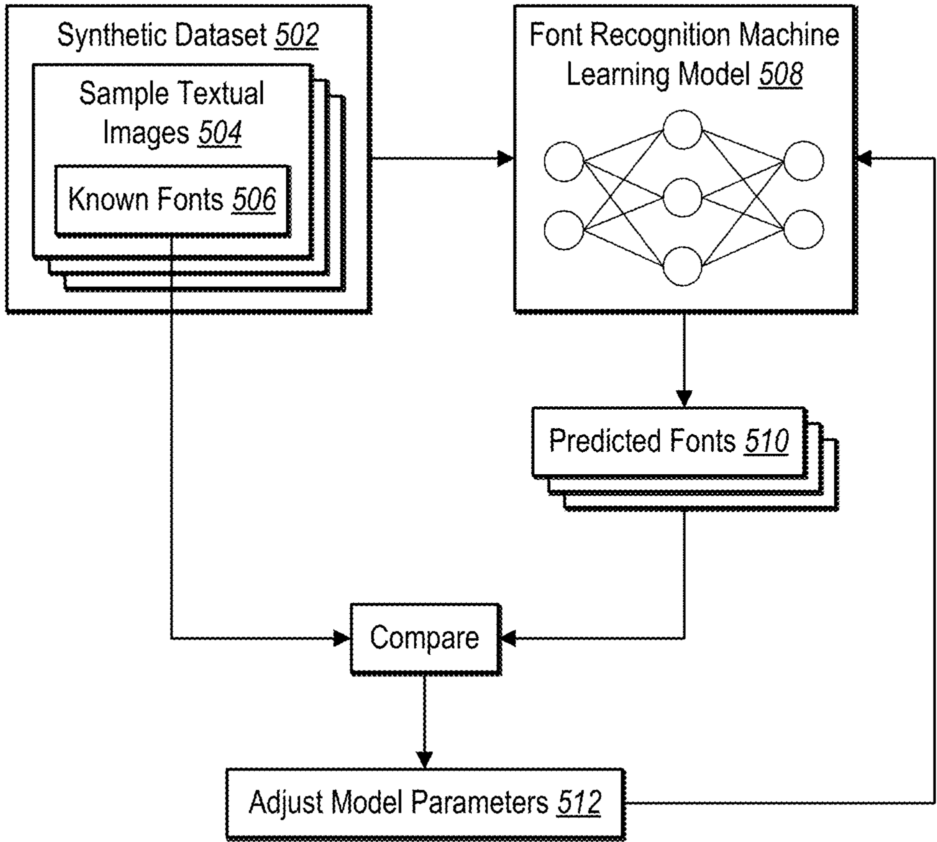
FIG. 5 illustrates a digital font matching system training a font recognition machine learning model in accordance with one or more embodiments.

As shown in FIG. 5, the synthetic dataset 502 comprises a plurality of sample textual images 504 generated using a multi-attribute probabilistic model with attributes sampled across a distribution of text/background attributes (e.g., as described above in relation to FIGS. 4A-4B). Also, in one or more embodiments, each sample textual image of the plurality of sample textual images 504 comprises a known font 506 of respective textual characters within each respective sample textual image. In some embodiments, for example, the known fonts 506 are sampled from a font list by the multi-attribute probabilistic model when generating the plurality of sample textual images 504. For example, the font list is included in a digital library of fonts and/or other digital assets.

As also shown in FIG. 5, the digital font matching system 106 utilizes the font recognition machine learning model 508 to generate predicted fonts 510 for the respective sample textual images 504. In some embodiments, for example, the digital font matching system 106 utilizes convolutional layers of the font recognition machine learning model 508 to extract features from the sample textual images 504 and generate the predicted fonts 510 from the extracted features. Additionally, the digital font matching system 106 compares the extracted features of the predicted fonts 510 with features corresponding to the known fonts 506 within a font list (e.g., the font list 306).

Based on a comparison of the predicted fonts 510 and the corresponding known fonts 506, the digital font matching system 106 adjusts one or more parameters 512 of the font recognition machine learning model 508 to reduce an error function. For example, the digital font matching system 106 determines a loss based on the comparison between the predicted fonts 510 and the known fonts 506 and utilizes the loss to adjust the model parameters 512. In one or more embodiments, for example, the digital font matching system 106 utilizes an Adam optimizer to train the font recognition machine learning model 508 using the synthetic dataset 502. Moreover, in some embodiments, the font recognition machine learning model 508 comprises a ResNet-34 convolutional neural network (or other feature encoding neural network). In certain such embodiments, the digital font matching system 106 applies a linear transformation to features extracted by the ResNet-34 convolutional neural network to reduce a dimensionality of the extracted features. By reducing the dimensionality of the features output by the feature encoding neural network for use in comparing the predicted fonts 510 to the known fonts 506, the digital font matching system 106 reduces an overall size of the font recognition machine learning model 508. Furthermore, in some embodiments, the digital font matching system 106 utilizes the font recognition machine learning model 508 with more or fewer layers to balance the accuracy and size/speed of the font recognition machine learning model 508.

Figure 6A:

To further illustrate, FIGS. 6A-6B show experimental results of a digital font matching system 106 determining predicted fonts for textual characters within digital images in accordance with embodiments of the present disclosure. Specifically, FIG. 6A shows comparative results of determining predicted fonts utilizing the digital font matching system 106 in comparison with results from an existing system. In particular, FIG. 6A shows predicted fonts 604 determined by the digital font matching system 106 for textual characters (the phrase "Give Thanks") within a target digital image 602 and fonts 606 recommended by an existing system. Indeed, as shown in FIG. 6A, the digital font matching system 106 determines predicted fonts 604 for textual characters within the target digital image 602 with increased accuracy and fidelity relative to the fonts 606 identified by the existing font recognition system.

Furthermore, FIG. 6B includes a table of comparative results of determining predicted fonts for textual characters within digital images utilizing the digital font matching system 106 in comparison with an existing font recognition system. Specifically, the rows of the table correspond to accuracy measurements associated with the existing system (labeled "Prior") and the digital font matching system 106 (labeled "Ours"), whereas the columns of the table correspond to a number of predicted fonts output by the two systems (labeled "Top-1," "Top-3," and "Top-10," respectively). Indeed, as further shown in FIG. 6B, in at least some implementations, the digital font matching system 106 significantly improves the accuracy of determining fonts which resemble or match fonts of textual characters within digital images.

Figure 7:
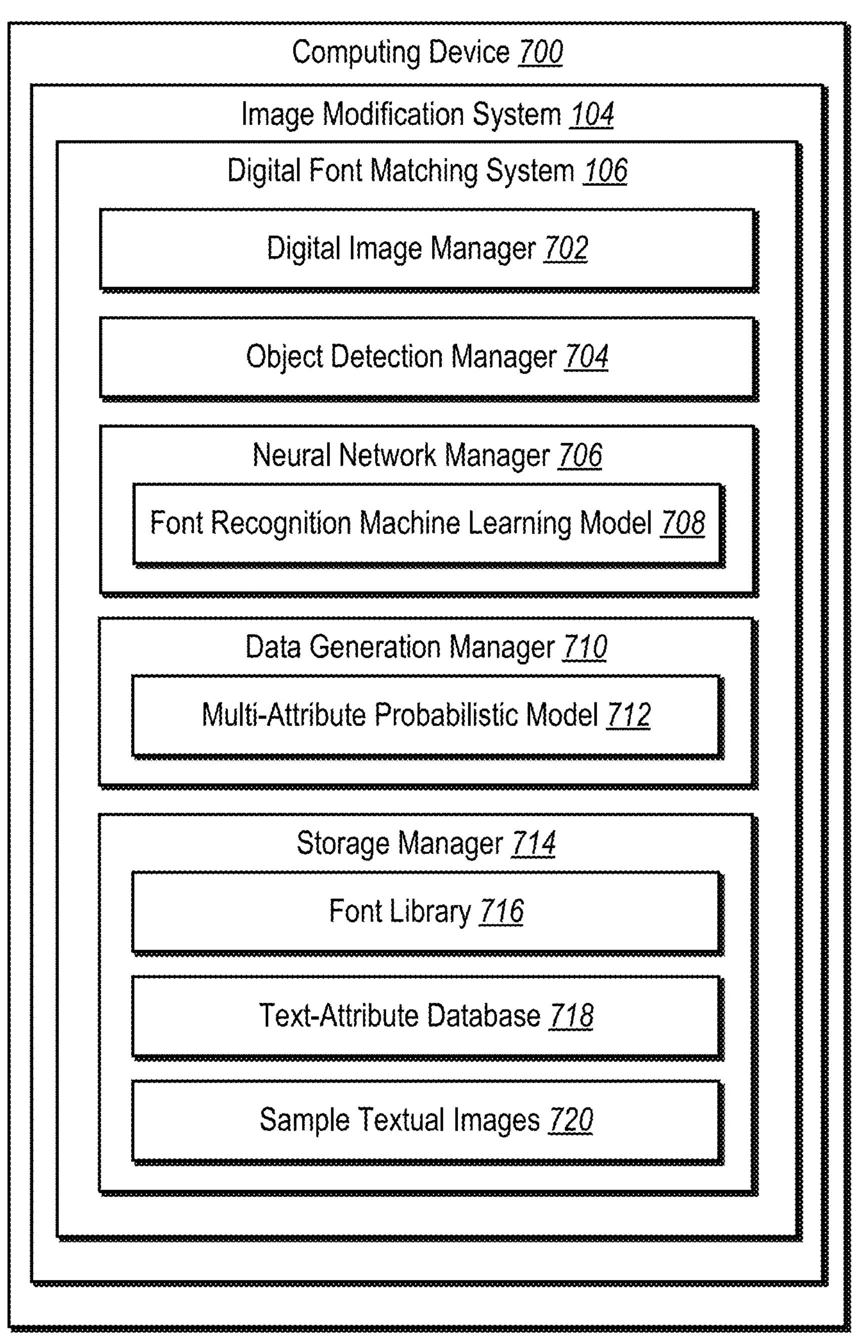
FIG. 7 illustrates a schematic diagram of a digital font matching system in accordance with one or more embodiments.

Turning now to FIG. 7, additional detail will be provided regarding components and capabilities of one or more embodiments of the digital font matching system 106. In particular, FIG. 7 illustrates an example digital font matching system 106 executed by a computing device 700 (e.g., the server devices(s) 102 or the client device 110). As shown by the embodiment of FIG. 7, the computing device 700 includes or hosts the image modification system 104 and the digital font matching system 106. Furthermore, as shown in FIG. 7, the digital font matching system 106 includes a digital image manager 702, an object detection manager 704, a neural network manager 706, a data generation manager 710, and a storage manager 714. Additionally, the illustrated digital font matching system 106 includes a font recognition machine learning model 708, a multi-attribute probabilistic model 712, a font library 716, a text-attribute database 718, and sample textual images 720. Each of the components mentioned above is described below in turn.

As just mentioned, and as illustrated in the embodiment of FIG. 7, the digital font matching system 106 includes the digital image manager 702. For instance, the digital image manager 702 identifies, stores, transmits, and/or displays digital images (and/or digital videos) as described above (e.g., in relation to FIGS. 1-6).

Furthermore, in one or more implementations, the digital font matching system 106 utilizes object detection to identify textual characters within digital images. In some embodiments, for instance, the object detection manager 704 detects textual characters via optical character recognition (OCR). Moreover, the digital font matching system 106, via the font recognition machine learning model 708, determines predicted font(s) for textual characters within digital images.

In some implementations, the digital font matching system 106 utilizes the neural network manager 706 to implement neural networks and other machine learning models, such as the font recognition machine learning model 708. In some embodiments, for instance, the neural network manager 706 utilizes the font recognition machine learning model 708 to extract features from a target digital image and determine one or more predicted fonts for textual characters within the target digital image.

In one or more implementations, the digital font matching system 106 utilizes the data generation manager 710 to implement the multi-attribute probabilistic model 712. In some embodiments, for instance, the data generation manager 710 utilizes the multi-attribute probabilistic model 712 to generate the sample textual images 720 across a distribution of text attributes from the text-attribute database 718 and with known fonts sampled from the font library 716.

Relatedly, in some implementations, the digital font matching system 106 utilizes the storage manager 714 to implement various data stores required for the disclosed methods, such as the font library 716, the text-attribute database 718, and the sample textual images 720.

Each of the components 702-720 of the digital font matching system 106 include software, hardware, or both. For example, the components 702-720 include one or more instructions stored on a computer-readable storage medium and executable by processors of one or more computing devices, such as a client device or server device. When executed by the one or more processors, the computer-executable instructions of the digital font matching system 106 causes the computing device(s) 700 to perform the methods described herein. Alternatively, the components 702-720 include hardware, such as a special-purpose processing device to perform a certain function or group of functions. Alternatively, the components 702-720 of the digital font matching system 106 include a combination of computer-executable instructions and hardware.

Furthermore, the components 702-720 of the digital font matching system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-720 may be implemented as a stand-alone application, such as a desktop or mobile application. Furthermore, the components 702-720 may be implemented as one or more web-based applications hosted on a remote server. The components 702-720 may also be implemented in a suite of mobile device applications or "apps." To illustrate, the components 702-720 may be implemented in an application, including but not limited to, ADOBE ACROBAT, ADOBE PHOTOSHOP, ADOBE ILLUSTRATOR, ADOBE CREATIVE CLOUD, or ADOBE TYPEKIT. "ADOBE," "ADOBE ACROBAT," "ADOBE PHOTOSHOP," "ADOBE ILLUSTRATOR," "ADOBE CREATIVE CLOUD," and "ADOBE TYPEKIT" are either registered trademarks or trademarks of Adobe Systems Incorporated in the United States and/or other countries.

Figure 8:
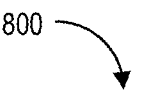
FIG. 8 illustrates a flowchart of a series of acts for utilizing a font recognition machine learning model to determine predicted fonts for textual characters within a target digital image in accordance with one or more embodiments.
Figure 8:
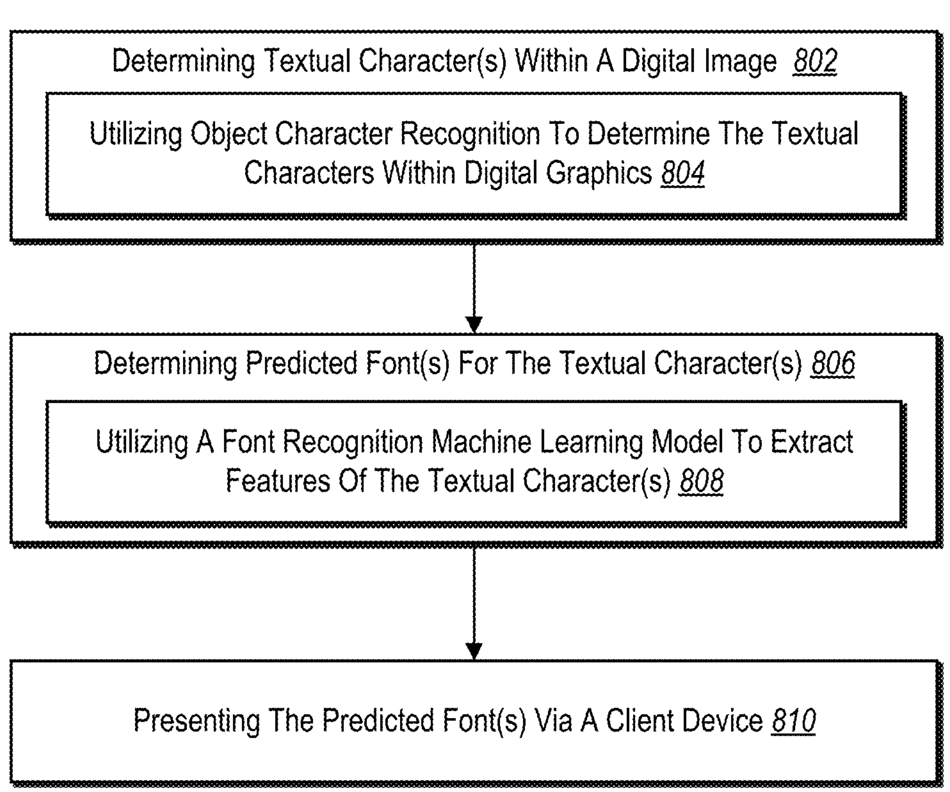
Figure 9:
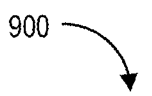
FIG. 9 illustrates a flowchart of a series of acts for generating a synthetic dataset comprising a plurality of sample textual images and utilizing the synthetic dataset to train a font recognition machine learning model in accordance with one or more embodiments.
Figure 9:
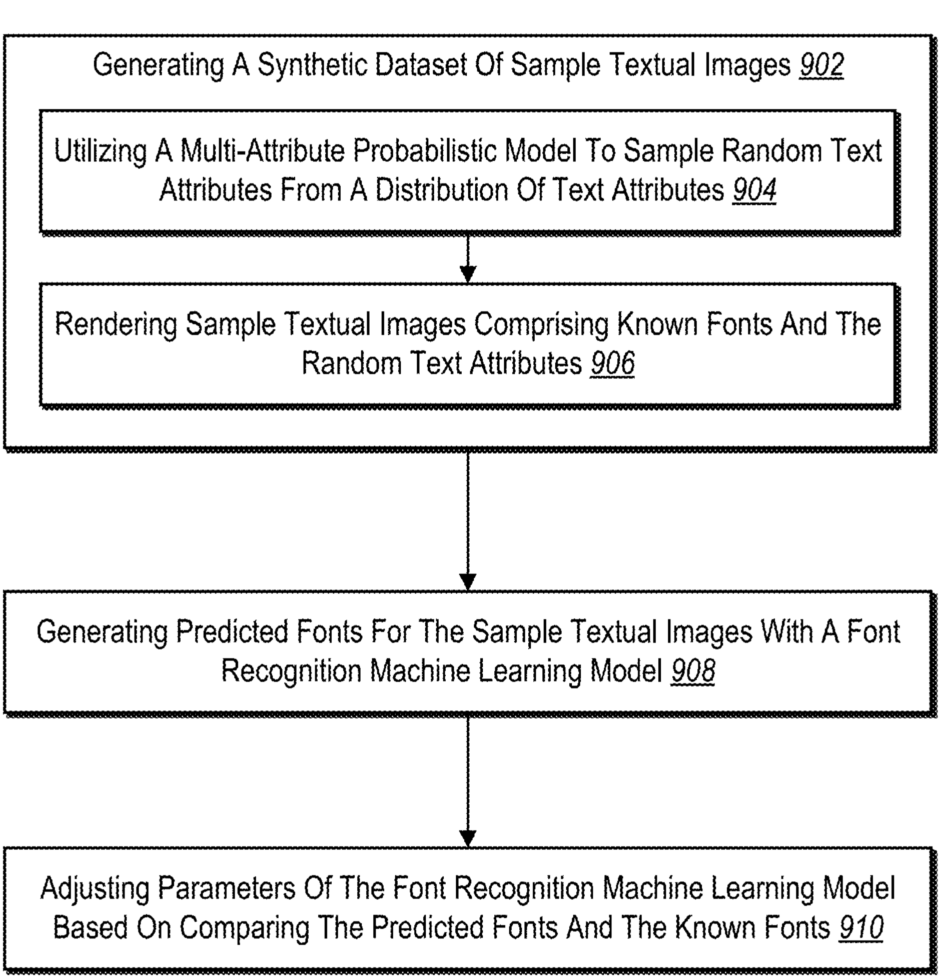

FIGS. 1-7, the corresponding text, and the examples provide a number of different methods, systems, devices, and non-transitory computer-readable media of the digital font matching system 106. In addition to the foregoing, one or more embodiments are also described in terms of flowcharts comprising acts for accomplishing a particular result, as shown in FIGS. 8-9. The acts shown in FIGS. 8-9 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIGS. 8-9. In some embodiments, a system can be configured to perform the acts of FIGS. 8-9. Alternatively, the acts of FIGS. 8-9 can be performed as part of a computer-implemented method.

As mentioned above, FIGS. 8 and 9 illustrate flowcharts of respective series of acts 800 and 900 for implementing a digital font matching system 106. In particular, FIG. 8 illustrates the series of acts 800 for determining predicted fonts for textual characters within a target digital image in accordance with one or more embodiments and FIG. 9 illustrates the series of acts 900 for generating and implementing a synthetic text dataset to train a font recognition machine learning model in accordance with one or more embodiments. While FIGS. 8-9 illustrate acts according to particular embodiments, alternative embodiments may omit, add to, reorder, and/or modify any acts shown in FIGS. 8-9.

As shown in FIG. 8, the series of acts 800 includes an act 802 of determining textual character(s) within a digital image, an act 804 of utilizing optical character recognition to determine the textual characters within digital graphics of the digital image, an act 806 of determining predicted font(s) for the textual character(s), an act 808 of utilizing a font recognition machine learning model to extract features of the textual character(s), and an act 810 of presenting the predicted font(s) via a client device.

For example, in one or more implementations, the series of acts 800 includes: determining one or more textual characters within a target digital image; determining one or more predicted fonts for the one or more textual characters utilizing a font recognition machine learning model to extract features of the one or more textual characters from the target digital image, the font recognition machine learning model comprising parameters learned from synthetic text data including sample textual images generated with a multi-attribute probabilistic model across a distribution of text attributes; and presenting, via a user interface on a client device, the one or more predicted fonts for the one or more textual characters.

In some implementations, the series of acts 800 also includes utilizing optical character recognition to determine the one or more textual characters within vector graphics or raster graphics of the target digital image. In one or more implementations, the series of acts 800 also includes generating a sample textual image of the sample textual images with the multi-attribute probabilistic model by randomly selecting a real image from a collection of real images and rendering one or more sample textual characters with the real image as a text background or a text fill.

Moreover, in one or more implementations, the series of acts 800 also includes generating a sample textual image of the sample textual images with the multi-attribute probabilistic model by randomly selecting a plurality of text attributes from attribute categories corresponding to the distribution of text attributes including two or more of a word length, a letter case, a font style, a font size, a measure of kerning, a degree of rotation, a background, a boundary, or a color. Also, in some implementations, the series of acts 800 includes generating the sample textual image by generating a raster image or a vector image including generated textual characters with selected text attributes and one or more background attributes.

In some implementations, the series of acts 800 also includes receiving a user selection of a replacement font based on the one or more predicted fonts for the one or more textual characters and replacing the one or more textual characters within the target digital image with one or more replacement textual characters comprising the replacement font. Also, in one or more implementations, the series of acts 800 includes modifying the one or more replacement textual characters within the target digital image by adding, removing, or replacing at least one textual character within the one or more replacement textual characters.

Furthermore, in one or more implementations, the series of acts 800 also includes providing the one or more predicted fonts for the one or more textual characters by providing, via the user interface on the client device, a plurality of selectable fonts for the one or more textual characters. Also, in some implementations, the series of acts 800 includes receiving, via the client device, a user selection of a preferred font from the plurality of selectable fonts for the one or more textual characters and replacing the one or more textual characters within the target digital image with one or more replacement textual characters comprising the preferred font. Also, in one or more implementations, the series of acts 800 includes generating a feature vector for the one or more textual characters by applying a linear transformation to reduce a dimensionality of the features extracted by the font recognition machine learning model.

As shown in FIG. 9, the series of acts 900 includes an act 902 of generating a synthetic dataset of sample textual images, an act 904 of utilizing a multi-attribute probabilistic model to sample random text attributes from a distribution of text attributes, an act 906 of rendering sample textual images comprising known fonts and the random text attributes, an act 908 of generating predicted fonts for the sample textual images with a font recognition machine learning model, and an act 910 of adjusting parameters of the font recognition machine learning model based on comparing the predicted fonts and the known fonts.

For example, in one or more implementations, the series of acts 900 includes: generating, utilizing the multi-attribute probabilistic model, a synthetic dataset comprising a plurality of sample textual images having random text attributes selected from a distribution of text attributes in the text-attribute database, a sample textual image of the plurality of sample textual images comprising a known font sampled from the text-attribute database in a rendered digital image format comprising one or more generated textual characters with selected text attributes and one or more background attributes; generating, utilizing the font recognition machine learning model, one or more predicted fonts for the sample textual image; and adjusting parameters of the font recognition machine learning model based on a comparison between the one or more predicted fonts and the known font for the sample textual image.

In some implementations, the series of acts 900 also includes: sampling, utilizing the multi-attribute probabilistic model, a word or phrase from a lexicon within the text-attribute database for a given sample textual image of the plurality of sample textual images; sampling, utilizing the multi-attribute probabilistic model, a font from a font list within the text-attribute database for the given sample textual image of the plurality of sample textual images; and rendering the sampled word or phrase in the sampled font against a background to generate the given sample textual image of the plurality of sample textual images.

Also, in one or more implementations, the series of acts 900 includes: sampling, utilizing the multi-attribute probabilistic model, additional text attributes comprising one or more of a letter case, a font size, a measure of kerning, or a degree of rotation from one or more respective value ranges for the given sample textual image of the plurality of sample textual images; and render the sampled word or phrase in the sample font with the additional text attributes to generate the given sample textual image of the plurality of sample textual images.

Further, in one or more implementations, the series of acts 900 includes: sampling, utilizing the multi-attribute probabilistic model, a measure of stroke or shadow from a respective value range for a text boundary for the given sample textual image of the plurality of sample textual images; and rendering the sampled word or phrase in the sample font and the sampled measure of stroke or shadow to generate the given sample textual image of the plurality of sample textual images.

Moreover, in some implementations, the series of acts 900 also includes: sampling, utilizing the multi-attribute probabilistic model, a fill color or image for characters of the given sample textual image of the plurality of sample textual images; sampling, utilizing the multi-attribute probabilistic model, a background color or image for the given sample textual image of the plurality of sample textual images; and render the sampled word or phrase in the sample font and the sampled fill color or image with the sampled background color or image to generate the given sample textual image of the plurality of sample textual images.

In one or more implementations, the series of acts 900 also includes generating the synthetic dataset by incorporating, utilizing the multi-attribute probabilistic model, one or more random adjustments to a sharpness, a brightness, or a saturation of each sample textual image of the plurality of sample textual images. In some implementations, the series of acts 900 also includes generating the plurality of sample textual images by rendering a plurality of raster images or vector images having the random text attributes selected from the text-attribute database according to the distribution of text attributes and backgrounds comprising a plurality of background attributes selected from a distribution of background attributes. In one or more implementations, the series of acts 900 also includes generating the one or more predicted fonts for the sample textual image of the plurality of sample textual images by utilizing convolutional layers of the font recognition machine learning model to extract learned features of textual characters within the sample textual image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
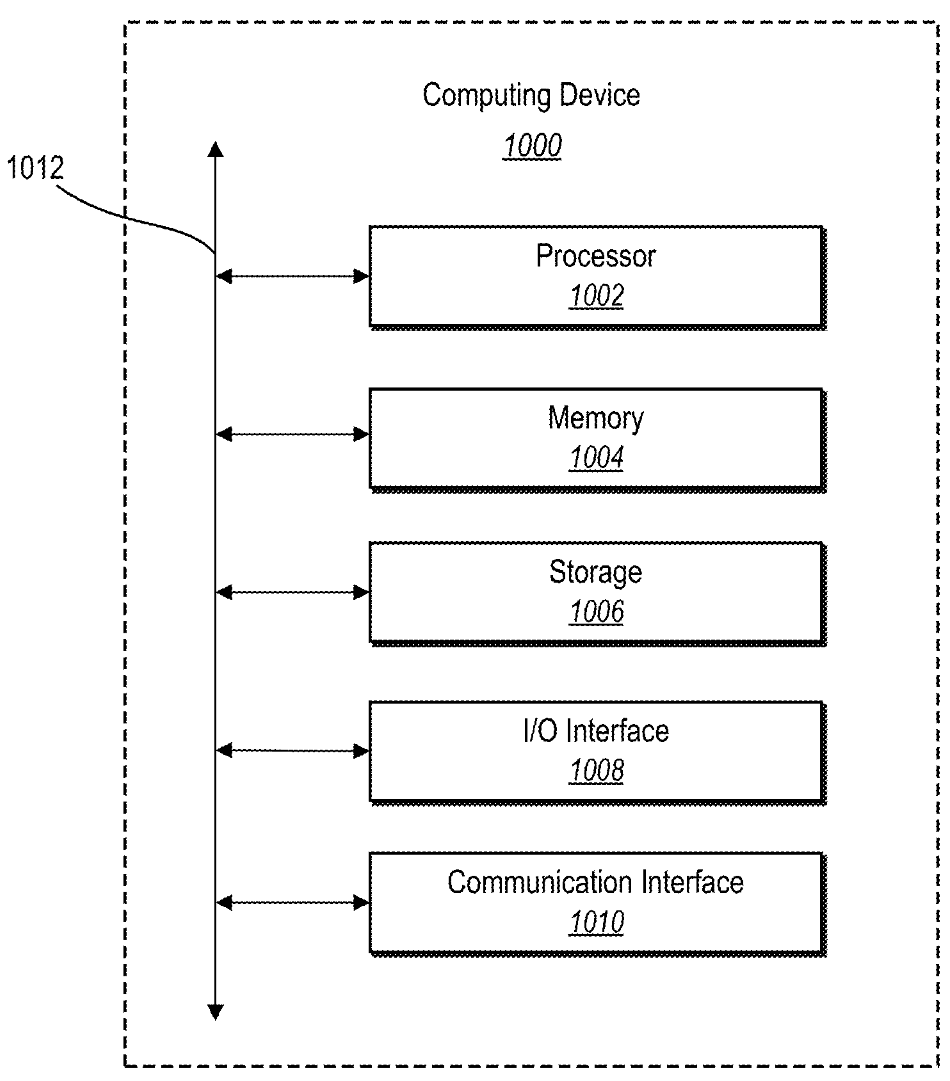
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 1000, server device(s) 102, and client device 110). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

determining one or more textual characters within a target digital image;

determining one or more predicted fonts for the one or more textual characters utilizing a font recognition machine learning model to extract features of the one or more textual characters from the target digital image, the font recognition machine learning model comprising parameters learned from synthetic text data including sample textual images generated with a multi-attribute probabilistic model by selecting, for a sample textual image of the sample textual images, two or more text attributes from a plurality of attribute categories corresponding to a distribution of text attributes; and presenting, via a user interface on a client device, the one or more predicted fonts for the one or more textual characters.

2. The computer-implemented method of claim 1, further comprising utilizing optical character recognition to determine the one or more textual characters within vector graphics or raster graphics of the target digital image.

3. The computer-implemented method of claim 1, further comprising generating a feature vector for the one or more textual characters by applying a linear transformation to reduce a dimensionality of the features extracted by the font recognition machine learning model.

4. The computer-implemented method of claim 1, further comprising generating a sample textual image of the sample textual images with the multi-attribute probabilistic model by randomly selecting a plurality of text attributes from attribute categories corresponding to the distribution of text attributes including two or more of a word length, a letter case, a font style, a font size, a measure of kerning, a degree of rotation, a background, a boundary, or a color.

5. The computer-implemented method of claim 4, wherein generating the sample textual image comprises generating a raster image or a vector image including generated textual characters with selected text attributes and one or more background attributes.

6. The computer-implemented method of claim 1, further comprising:

receiving a user selection of a replacement font based on the one or more predicted fonts for the one or more textual characters; and replacing the one or more textual characters within the target digital image with one or more replacement textual characters comprising the replacement font.

7. The computer-implemented method of claim 6, further comprising modifying the one or more replacement textual characters within the target digital image by adding, removing, or replacing at least one textual character within the one or more replacement textual characters.

8. A non-transitory computer-readable medium storing executable instructions, which when executed by at least one processor, cause the at least one processor to perform operations comprising:

determining one or more textual characters within a target digital image;

determining one or more predicted fonts for the one or more textual characters utilizing a font recognition machine learning model to extract features of the one or more textual characters from the target digital image, the font recognition machine learning model comprising parameters learned from synthetic text data including sample textual images generated with a multi-attribute probabilistic model by selecting, for a sample textual image of the sample textual images, two or more text attributes from a plurality of attribute categories corresponding to a distribution of text attributes; and providing, via a user interface on a client device, the one or more predicted fonts for the one or more textual characters.

9. The non-transitory computer-readable medium of claim 8, wherein providing the one or more predicted fonts for the one or more textual characters further comprises providing, via the user interface on the client device, a plurality of selectable fonts for the one or more textual characters.

10. The non-transitory computer-readable medium of claim 9, the operations further comprising:

receiving, via the client device, a user selection of a preferred font from the plurality of selectable fonts for the one or more textual characters; and replacing the one or more textual characters within the target digital image with one or more replacement textual characters comprising the preferred font.

11. The non-transitory computer-readable medium of claim 10, the operations further comprising generating a feature vector for the one or more textual characters by applying a linear transformation to reduce a dimensionality of the features extracted by the font recognition machine learning model.

12. The non-transitory computer-readable medium of claim 8, further comprising generating a sample textual image of the sample textual images with the multi-attribute probabilistic model by randomly selecting a real image from a collection of real images and rendering one or more sample textual characters with the real image as a text background or a text fill.

13. A system comprising:

one or more memory devices a font recognition machine learning model; and one or more processors configured to cause the system to:

determine one or more textual characters within a target digital image;

determine one or more predicted fonts for the one or more textual characters utilizing the font recognition machine learning model to extract features of the one or more textual characters from the target digital image, the font recognition machine learning model comprising parameters learned from synthetic text data including sample textual images generated with a multi-attribute probabilistic model by selecting, for a sample textual image of the sample textual images, two or more text attributes from a plurality of attribute categories corresponding to a distribution of text attributes; and present, via a user interface on a client device, the one or more predicted fonts for the one or more textual characters.

14. The system of claim 13, wherein the one or more processors are further configured to cause the system to determine, utilizing optical character recognition, the one or more textual characters within vector graphics or raster graphics of the target digital image.

15. The system of claim 13, wherein the one or more processors are further configured to cause the system to generate a feature vector for the one or more textual characters by applying a linear transformation to reduce a dimensionality of the features extracted by the font recognition machine learning model.

16. The system of claim 13, wherein the one or more processors are further configured to cause the system to generate a sample textual image of the sample textual images with the multi-attribute probabilistic model by randomly selecting a plurality of text attributes from attribute categories corresponding to the distribution of text attributes including two or more of a word length, a letter case, a font style, a font size, a measure of kerning, a degree of rotation, a background, a boundary, or a color.

17. The system of claim 16, wherein the one or more processors are further configured to cause the system to generate the sample textual image by generating a raster image or a vector image including generated textual characters with selected text attributes and one or more background attributes.

18. The system of claim 13, wherein the one or more processors are further configured to cause the system to generate a sample textual image of the sample textual images with the multi-attribute probabilistic model by randomly selecting a real image from a collection of real images and rendering one or more sample textual characters with the real image as a text background or a text fill.

19. The system of claim 13, wherein the one or more processors are further configured to cause the system to:

receive a user selection of a replacement font based on the one or more predicted fonts for the one or more textual characters; and replace the one or more textual characters within the target digital image with one or more replacement textual characters comprising the replacement font.

20. The system of claim 19, wherein the one or more processors are further configured to cause the system to modify the one or more replacement textual characters within the target digital image by adding, removing, or replacing at least one textual character within the one or more replacement textual characters.

* * * * *